United States Patent [19]

Mooradian

[11] Patent Number: 4,860,304
[45] Date of Patent: Aug. 22, 1989

[54] SOLID STATE MICROLASER

[75] Inventor: Aram Mooradian, Winchester, Mass.

[73] Assignee: Massachusetts Institute of Technology, Cambridge, Mass.

[21] Appl. No.: 151,396

[22] Filed: Feb. 2, 1988

[51] Int. Cl.[4] .......................... H01S 3/05; H01S 0/98
[52] U.S. Cl. ...................................... 372/92; 372/19; 372/41; 372/75
[58] Field of Search ....................... 372/92, 39, 41, 19, 372/20, 75

[56] References Cited

U.S. PATENT DOCUMENTS 4,002,725  1/1977  Bridenbaugh et al. ............... 372/41
4,734,912  3/1988  Scerbak et al. ........................ 372/75

OTHER PUBLICATIONS

Orazio Svelto, *Principles of Lasers* ©1976 Plenum Press, New York and London, pp. 168–179.
Owyoung et al., "Stress-Induced Tuning of a Diode-Laser-Excited Monolithic Nd:YAG Laser", Optics Letters, vol. 12, No. 12, Dec. 1987, pp. 999–1001.
Zhou et al., "Efficient, Frequency-Stable Laser-Diode-Pumped ND:YAG Laser", Optics Letters, vol. 10, No. 2, Feb. 1985, pp. 62–64.
Kubodera et al., "Pure Single-Mode LiNdP4O12 Solid-State Laser Transmitter for 1.3 μm Fiber-Optic Communications", Applied Optics, vol. 21, No. 19, pp. 3466–3469.
Kubodera et al., "Efficient LiNdP4O12 Lasers Pumped with a Laser Diode", Applied Optics, vol. 18, No. 23, Dec. 1979, pp. 3882–3883.
Winzer et al., "Laser Emission from Miniaturized NdAl$_3$(BO$_3$)$_4$ Crystals with Directly Applied Mirrors", IEEE, 1978, pp. 840–843.
Winzer et al., "Laser Emission from Polished NdP$_5$O$_{14}$ Crystals with Directly Applied Mirrors", Applied Physics, 11-121-130 (1976).
Owyoung et al., "Gain Switching of a Monolithic Single-Frequency Laser-Diode-Excited Nd:YAG Laser", Optics Letters, vol. 10, No. 10, Oct. 1985, pp. 484–486.
Stone et al., "Self-Contained LED-Pumped Single--Crystal Nd:YAG Fiber Laser", Fiber and Integrated Optics, vol. 2, No. 1, 1979, pp. 19–46.
Spectral Characteristics of External-Cavity Controlled Semiconductor Lasers, IEEE Journal of Quantum Electronics, vol. QE-17, No. 1, Jan. 1981, Mark W. Fleming and Aram Mooradian.
Laser Linewidth, Physics Today, May 1985, American Institute of Physics, Aram Mooradian.
Coherent Optical Detection: A Thousand Calls on One Circuit, IEEE Spectrum, Feb. 1987, pp. 52–57, Richard A. Linke and Paul S. Henry.

*Primary Examiner*—James W. Davie

[57] ABSTRACT

A solid state gain medium is disposed between two mirrors to form a resonant cavity, the cavity length selected so that the gain bandwidth of the gain medium is less than the frequency separation of the cavity modes. By selecting this cavity length, only a single longitudinal mode will oscillate when the laser operates in a single transverse mode. The microlaser is optically pumped by any appropriate source such as a semiconductor injection laser or laser array. Suitable gain media are Nd:YAG and Nd pentaphosphate.

13 Claims, 1 Drawing Sheet

SOLID STATE MICROLASER

BACKGROUND OF THE INVENTION

This invention relates to optically pumped solid state lasers.

Optically pumped solid state lasers have been demonstrated to be useful sources of coherent radiation for more than twenty years. For example, semiconductor lasers have been used to pump solid state crystalline materials such as Nd:YAG and are now available commercially. In most laser materials, especially solid state crystals such as Nd:YAG, the presence of spectral and/or spatial hole burning will cause more than one longitudinal mode to oscillate in devices where the intracavity mode spacing is less than the gain bandwidth of the active medium. These known devices require mode selecting elements in the laser resonator to achieve single frequency operation or operating in a ring cavity configuration.

SUMMARY OF THE INVENTION

The solid state, optically pumped microlaser includes a solid state gain medium disposed between two mirrors, the distance between the mirrors, the cavity length, selected so that the gain bandwidth of the gain medium is less than the frequency separation of the cavity modes. In a preferred embodiment the mirrors are in the form of coatings deposited directly on the gain medium. Alternatively, the mirrors may be separate elements and bonded to the gain medium in a sandwich configuration.

Because the cavity length is selected to provide an intracavity mode spacing larger than the bandwidth of the active gain medium, only a single longitudinal mode will oscillate when the device operates in a single transverse mode. Optical pumping may be provided by any appropriate source such as a semiconductor injection laser or laser array.

DESCRIPTION OF THE PREFERRED EMBODIMENT

Figure 1:
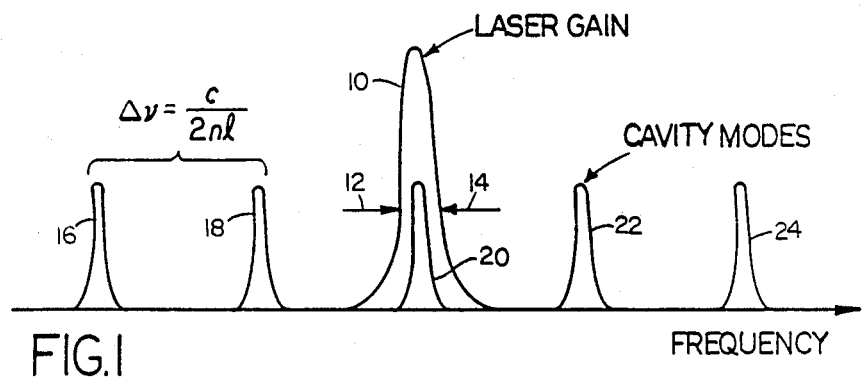
FIG. 1. is a graph of gain bandwidth and cavity modes as a function of frequency.

The theory on which the present invention is based will now be discussed in conjunction with FIG. 1. A curve 10 is a plot of gain versus frequency for a solid state gain medium such as Nd:YAG or Nd pentaphosphate. The gain bandwidth of the curve 10 is defined as the separation between the arrows 12 and 14. Also shown in FIG. 1 are intracavity modes 16–24 as a function of frequency. The separation between adjacent ones of the cavity modes 16–24 is given by the equation $\nu_c = c/2nl$, where c is the speed of light, n is the refractive index of a gain medium and l is the length of the resonant cavity. As will be appreciated by those skilled in the art, if the spacing $\nu_c$ of cavity modes is greater than the gain bandwidth $\nu_g$, then only a single longitudinal mode will oscillate when the oscillator operates in a single transverse mode.

Figure 2:
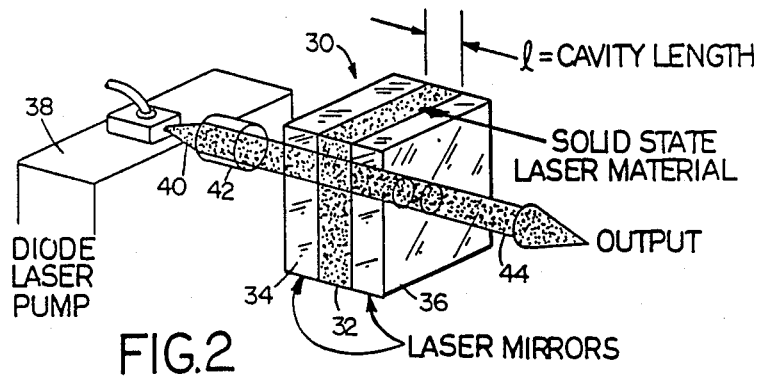
FIG. 2 is a perspective view of a microlaser according to the present invention.

With reference to FIG. 2, a microlaser 30 includes a solid state gain medium 32 disposed between a pair of mirrors 34 and 36. In accordance with the discussion above in conjunction with FIG. 1, the cavity length l between the mirrors 34 and 36 satisfies the inequality: $l < c/2n\nu_g$ where $\nu_g$ is the bandwidth of the gain medium. Suitable solid state gain media are Nd:YAG and Nd pentaphosphate. The laser mirrors 34 and 36 may either be deposited as coatings directly on opposing surfaces of the laser gain medium 32 or made using thin glass or other appropriate material and subsequently bonded to the gain medium 32 to form a sandwich structure. For a laser gain medium such as Nd:YAG, the cavity length would be approximately several hundred $\mu$m, while for a stoichiometric compound laser material such as Nd pentaphosphate, cavity lengths will be typically in the range of 10–100 $\mu$m.

Figure 3:
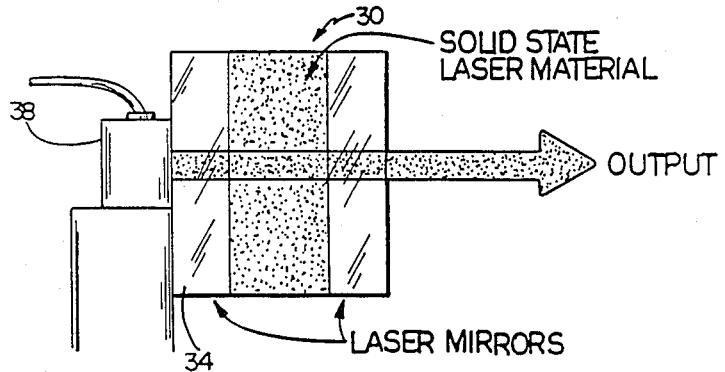
FIG. 3 is a cross-sectional view of an embodiment of the microlaser with the diode laser pump bonded to one of the laser mirrors.

In operation, the microlaser 30 is excited by an appropriate source such as a semiconductor injection laser or laser array. A diode laser pump 38 is shown in FIG. 2. A pump beam 40 from the diode laser pump 38 is focused by an optical focusing system 42 and optically pumps the microlaser 30 such that it operates in a single spatial mode. The microlaser 30 then generates an output beam 44. Alternatively, the diode laser pump 38 may be bonded directly to the mirror 34 of the microlaser 30 as shown in FIG. 3.

In the case where the absorption length of the pump laser radiation is longer than the length of the laser material, an enhancement of the pump laser absorption can be made by placing the laser material inside a Fabry-Perot type resonator at the pump laser wavelength. For example, referring to FIG. 2, the dielectric coatings on both laser mirrors would have high reflectivity at the pump laser wavelength in addition to being properly coated at the wavelength of the laser material.

The microlaser 30 may be made to operate at several wavelengths including the 1.32 $\mu$m transition of Nd which would be useful for optical fiber communications and fiber sensors. Furthermore, the frequency of the microlaser 30 may be locked to a secondary frequency reference such as an atomic or molecular absorption to provide a well defined carrier frequency as a communications standard. A multiplexed communications system may be operated by generating side bands from the frequency locked master oscillator. Such a system will allow for any communications system to be compatible with any other system because each channel will have an absolutely identifiable frequency.

The microlaser 30 may be tuned in a number of ways such as changing the effective length of the optical cavity. Cavity length may be changed by altering the refractive index of the gain medium or of some other material contained within the laser cavity. The mechanism for altering refractive index may be thermal or electronic by utilizing a temperature dependent refractive index effect or an electro-optic or piezoelectric effect, respectively. Alternatively, a piezoelectric or other mechanical device may be employed to move one of the laser cavity mirrors for laser tuning.

The microlaser 30 can be made quite compact and stable using microfabrication techniques similar to those used in the semiconductor fabrication industry. The design of the microlaser 30 renders it able to withstand significant shocks for operation under adverse conditions. One application for a microlaser 30 device would be for fiber optic gyros which require narrow line width operation.

The microlaser 30 may also be operated at low temperature (from the temperature of liquid helium at 1.5° Kelvin to just below room temperature). Such operation will provide for stable, precision frequency output. The spectral gain linewidths for the active gain materials can become quite narrow at low temperatures (less than 100 MHz in some cases). By locking the microlaser 30 to its own gain peak using a number of well known techniques, an absolute frequency of operation may be obtained with an accuracy of as little as a few kilohertz.

It is recognized that modifications and variations of the present invention will occur to those skilled in the art and it is intended that all such modifications and variations be included within the scope of the appended claims.

What is claimed is:

1. Solid state, optically pumped microlaser comprising:
a solid state gain medium disposed between two mirrors, the distance between the mirrors selected so that the gain bandwidth of the gain medium is less than the frequency separation of the cavity modes.

2. The microlaser of claim 1 wherein the distance, l, between the mirrors satisfies the inequality: $l < c/2n\nu_g$ where c is the speed of light, n is the refractive index in the gain medium, and $\nu_g$ is the gain bandwidth of the gain medium.

3. The microlaser of claim 1 wherein the mirrors are in the form of coatings deposited directly on opposing surfaces of the gain medium.

4. The microlaser of claim 1 wherein the mirrors are separate elements bonded to opposing surfaces of the gain medium.

5. The microlaser of claim 1 wherein the gain medium is Nd:YAG.

6. The microlaser of claim 1 wherein the gain medium is Nd pentaphosphate.

7. The microlaser of claim 1 wherein the gain medium is Nd:YAG and the separation between mirrors is in the range of several hundred μm.

8. The microlaser of claim 1 wherein the gain medium is Nd pentaphosphate and the separation between the mirrors is in the range of 10–100 μ'm.

9. The microlaser of claim 1 further including a semiconductor diode laser adjacent to the microlaser for optically pumping the microlaser.

10. The microlaser of claim 9 wherein the microlaser is bonded to the semiconductor diode laser.

11. The microlaser of claim 1 wherein the gain medium and mirrors form a Fabry-Perot type resonator at the frequency at which the microlaser is optically pumped.

12. The microlaser of claim 3 wherein the coatings have high reflectivity at the wavelength at which the gain medium is optically pumped.

13. The microlaser of claim 9 wherein the mirrors include dielectric coatings having high reflectivity at the semiconductor diode pump laser frequency.

* * * * *

UNITED STATES PATENT AND TRADEMARK OFFICE
CERTIFICATE OF CORRECTION

PATENT NO. : 4,860,304

DATED : August 22, 1989

INVENTOR(S) : Aram Mooradian

It is certified that error appears in the above-identified patent and that said Letters Patent is hereby corrected as shown below:

Title page, first paragraph following the "Background of the Invention", insert:

---The Government has rights in this invention pursuant to Contract Number F19628-85-C-0002 awarded by the Department of the Air Force.---

Signed and Sealed this

Third Day of December, 1991

Attest:

HARRY F. MANBECK, JR.

*Attesting Officer*  *Commissioner of Patents and Trademarks*